United States Patent
He et al.

(10) Patent No.: US 11,543,799 B2
(45) Date of Patent: Jan. 3, 2023

(54) SYSTEM AND METHOD FOR EVALUATING RESIDUAL OPERATING LIFE OF MACHINE COMPONENT

(71) Applicant: Buffalo Machinery Company Limited, Taichung (TW)

(72) Inventors: Yi-Lin He, Taichung (TW); Hsun-Fu Chiang, Taichung (TW); Chia-Hui Tang, Taichung (TW); Paul Chang, Taichung (TW)

(73) Assignee: Buffalo Machinery Company Limited, Taichung (TW)

( * ) Notice: Subject to any disclaimer, the term of this patent is extended or adjusted under 35 U.S.C. 154(b) by 725 days.

(21) Appl. No.: 16/511,125

(22) Filed: Jul. 15, 2019

(65) Prior Publication Data

US 2020/0225639 A1    Jul. 16, 2020

(30) Foreign Application Priority Data

Jan. 16, 2019    (TW) ................. 108200715

(51) Int. Cl.
  *G05B 19/4065*    (2006.01)
  *G05B 23/02*    (2006.01)
  *G05B 19/418*    (2006.01)
  *G01M 13/028*    (2019.01)

(52) U.S. Cl.
  CPC ....... *G05B 19/4065* (2013.01); *G01M 13/028* (2013.01); *G05B 19/41825* (2013.01); *G05B 23/0283* (2013.01); *G05B 2219/37252* (2013.01); *G05B 2219/37258* (2013.01); *G05B 2219/50185* (2013.01)

(58) Field of Classification Search
  None
  See application file for complete search history.

(56) References Cited

U.S. PATENT DOCUMENTS

| | | | | |
|---|---|---|---|---|
| 2010/0147627 A1* | 6/2010 | Lakomiak | ............... | G01H 1/003 184/7.4 |
| 2018/0217109 A1* | 8/2018 | Bowers, III | ........ | G01N 29/4427 |
| 2019/0186690 A1* | 6/2019 | Berkebile | ........... | F16H 57/0449 |
| 2020/0063548 A1* | 2/2020 | Cai | ..................... | F16K 37/0083 |
| 2021/0016443 A1* | 1/2021 | Endo | .................... | B25J 19/0095 |

FOREIGN PATENT DOCUMENTS

WO    WO-2010109809 A1 *    9/2010    ............... G01H 1/00

OTHER PUBLICATIONS

Machine translation of WO-2010109809-A1 (Year: 2010).*

* cited by examiner

*Primary Examiner* — Michael J Dalbo
(74) *Attorney, Agent, or Firm* — Banner & Witcoff, Ltd.

(57) ABSTRACT

A control system for evaluating residual operating life of a machine component of a machine tool includes a sensor and a control system. The sensor is disposed on the machine tool and is configured to sense movement of the machine component. The control device is configured to calculate a length of time based on a sense signal received from the sensor and sampled at a time point right after the machine component is freshly oiled, and to enable output of an alarm when determining that the length of time thus calculated is smaller than a predetermined length.

15 Claims, 3 Drawing Sheets

SYSTEM AND METHOD FOR EVALUATING RESIDUAL OPERATING LIFE OF MACHINE COMPONENT

CROSS-REFERENCE TO RELATED APPLICATION

This application claims priority of Taiwanese Utility Model Patent Application No. 108200715, filed on Jan. 16, 2019.

FIELD

The disclosure relates to a method and a system for evaluating residual operating life of a machine component of a machine tool.

BACKGROUND

A machine tool uses guide rails to limit moving directions of its components. However, as the hours of use accumulate, the guide rails might be worn or damaged. For example, scratches or pits may appear on the guide rails. Such damages may cause undesired high-frequency vibrations that adversely affect the operation of the machine tool, creating faulty products. Severe damages may even cause a breakdown of the machine tool or injury of an operator of the machine tool. For the sake of product quality and personnel safety, damaged machine parts (especially severely damaged ones) of the machine tool should be replaced in time.

SUMMARY

An object of the disclosure is to provide a control system and a method for evaluating residual operating life of a machine component of a machine tool that can efficiently improve safety and accuracy of operation of the machine tool.

According to one aspect of the disclosure, the control system includes a sensor to be disposed on the machine tool, and a control device. The sensor is configured to sense movement of the machine component, and to output a sense signal related to vibration of the machine component based on the movement of the machine component thus sensed. The control device is configured to output an oiling signal to the machine tool to trigger an oiling device of the machine tool to oil the machine component. The control device is further configured to calculate a current vibration value based on the sense signal sampled at a current time point after a current output of the oiling signal. The control device is further configured to calculate a slope value based at least on the current time point and the current vibration value. The control device is further configured to calculate a first length of time based on the slope value, the current vibration value and a first predetermined vibration threshold. The control device is further configured to determine whether the first length of time is smaller than a first predetermined length. The control device is further configured to enable output of a first alarm when it is determined that the first length of time is smaller than the first predetermined length.

According to one aspect of the disclosure, the method is to be implemented by a control device based on a sense signal outputted by a sensor that is disposed on the machine tool. The method comprises, right after a current output of an oiling signal to the machine tool by the control device to trigger an oiling device of the machine tool to oil the machine component, steps of: calculating a current vibration value based on the sense signal sensed at a current time point; calculating a slope value based at least on the current time point and the current vibration value; calculating a length of time based on the slope value, the current vibration value and a predetermined vibration threshold; determining whether the length of time is smaller than a predetermined length; and enabling output of an alarm when it is determined that the length of time is smaller than the predetermined length.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
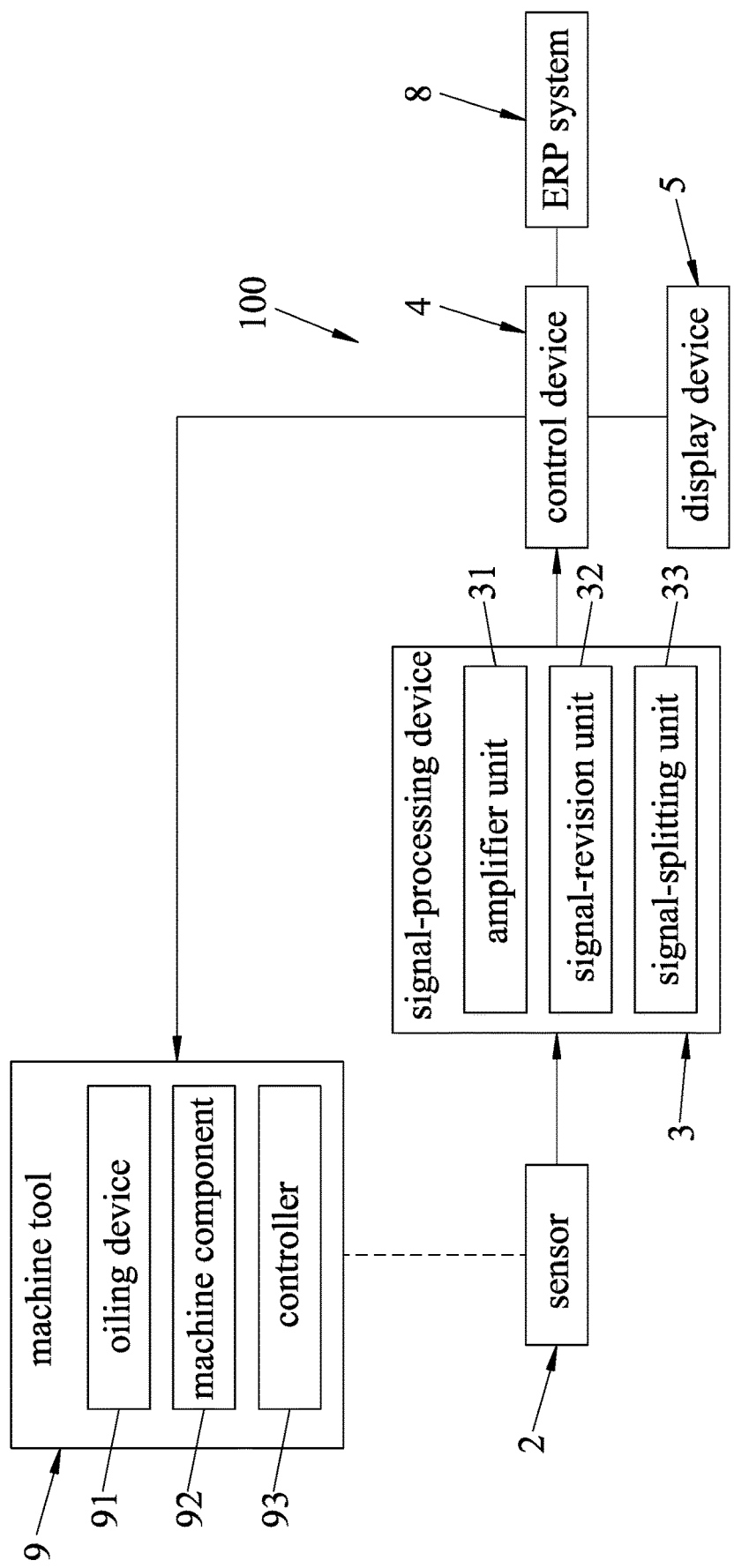
FIG. 1 is a block diagram exemplarily illustrating a control system according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a control system 100 for controlling oil-injection of a machine tool 9 is disclosed in accordance with an embodiment of the disclosure. The machine tool 9 may be, for example, one that includes a machine component 92, an oiling device 91 configured to inject oil to the machine component 92 (i.e., to oil the machine component 92), and a controller 93 coupled to the oiling device 91 and the machine component 92 to control operation of the oiling device 91 and the machine component 92. The machine tool 9 may be, for example, a numerical control (NC) machine tool. The machine component 92 may include, for example, at least one linear slide rail and/or at least one bearing (e.g., a linear-motion bearing), and the oiling device 91 may be configured to inject oil onto the linear slide rail(s) and/or the bearing(s). The control system 100 includes a sensor 2, a signal-processing device 3 in communication with the sensor 2, and a control device 4 electrically connected to the signal-processing device 3. In an embodiment, the control device 4 is independent of the controller 93 of the machine tool 9. In another embodiment, the control device 4 is incorporated with or integrated within the controller 93.

According to an embodiment, the sensor 2 of the control system 100 is positioned in the vicinity of the machine tool 9 to sense movement of the machine component 92, and is configured to output a sense signal related to vibration of the machine component 92 based on the movement of the machine component 92 thus sensed. In an embodiment, the sensor 2 is disposed on the machine tool 9. According to some embodiments, the sense signal outputted by the sensor 2 may represent acceleration, velocity, or displacement of the movement of the machine component 92, and the sensor may be, for example, an accelerometer for acceleration measurement, a velocimeter for velocity measurement, or an optical linear encoder for position measurement. It should be noted that acceleration, velocity and displacement are mutually convertible parameters. That is, regardless of whether the sense signal outputted by the sensor 2 represents acceleration, velocity or displacement, the acceleration, velocity and displacement of the movement of the machine component 92 can all be derived from the sense signal.

The signal-processing device 3 is configured to receive the sense signal from the sensor 2, to derive a high-frequency signal and a low-frequency signal from the sense signal, and to output the high-frequency signal and the low-frequency signal. The high-frequency signal corresponds to a high frequency band (e.g., 5 kHz to 50 kHz), and may relate to undesired vibration of the machine component 92. The low-frequency signal corresponds to a low frequency band (e.g., 0.001 Hz to 100 Hz), and may relate to a frequency of the movement of the machine component 92 during operation. In the illustrated embodiment, the signal-processing device 3 includes an amplifier unit 31, a signal-revision unit 32 in communication with the amplifier unit 31, and a signal-splitting unit 33 in communication with the signal-revision unit 32. The amplifier unit 31, the signal-revision unit 32 and the signal-splitting unit 33 may be electrical circuits.

In an embodiment, the amplifier unit 31 is an amplifier circuit, and is configured to receive the sense signal from the sensor 2, and to amplify the received sense signal into an amplified signal in order to facilitate performance of the signal-revision unit 32 and the signal-splitting unit 33. The signal-revision unit 32 is configured to receive the amplified signal from the amplifier unit 31, and to adjust the amplified signal to form a revised signal based on amplitude responses of a predetermined frequency response curve of the machine component 92, such that the revised signal may truly reflect the excitation force on the machine component 92 (namely, the force that contributes to the vibration of the machine component 92) to accurately evaluate vibration of the machine component 92. The frequency response curve of the machine component 92 may be predetermined by using a conventional test, for example, the impact hammer modal testing. The signal-splitting unit 33 is configured to receive the revised signal from the signal-revision unit 32, and to extract, from the revised signal, a low-frequency split signal and a high-frequency split signal corresponding respectively to the low frequency band and the high frequency band. The low-frequency split signal and the high-frequency split signal would be outputted by the signal-processing device 3 as the low-frequency signal and the high-frequency signal, respectively. According to some embodiments, the signal-splitting unit 33 may be implemented by analog filters or digital filters including, for example, a low pass filter and a high pass filter, and may be plural band pass filters.

It should be noted that an alteration may be made to the signal-processing device 3 such that the amplified signal generated by the amplifier unit 31 is transmitted to the signal splitting unit 33 instead of the signal-revision unit 32. In such an embodiment, the signal splitting unit 33 extracts the low-frequency split signal and the high-frequency split signal from the amplified signal that has not been adjusted by the signal-revision unit 32, and then transmits the low-frequency split signal and the high-frequency split signal to the signal-revision unit 32 to be adjusted based on the frequency response curve of the machine component 92. In this case, since there are two signals to be adjusted by the signal-revision unit 32, the signal-revision unit 32 correspondingly generates two revised signals that might be referred to as, for example, low-frequency revised signal and high-frequency revised signal. In this case, the low-frequency signal and the high-frequency signal outputted by the signal-processing device 3 are the low-frequency revised signal and the high-frequency revised signal generated by the signal-revision unit 32 based on the low-frequency split signal and the high-frequency split signal received from the signal splitting unit 33, respectively.

Figure 2:
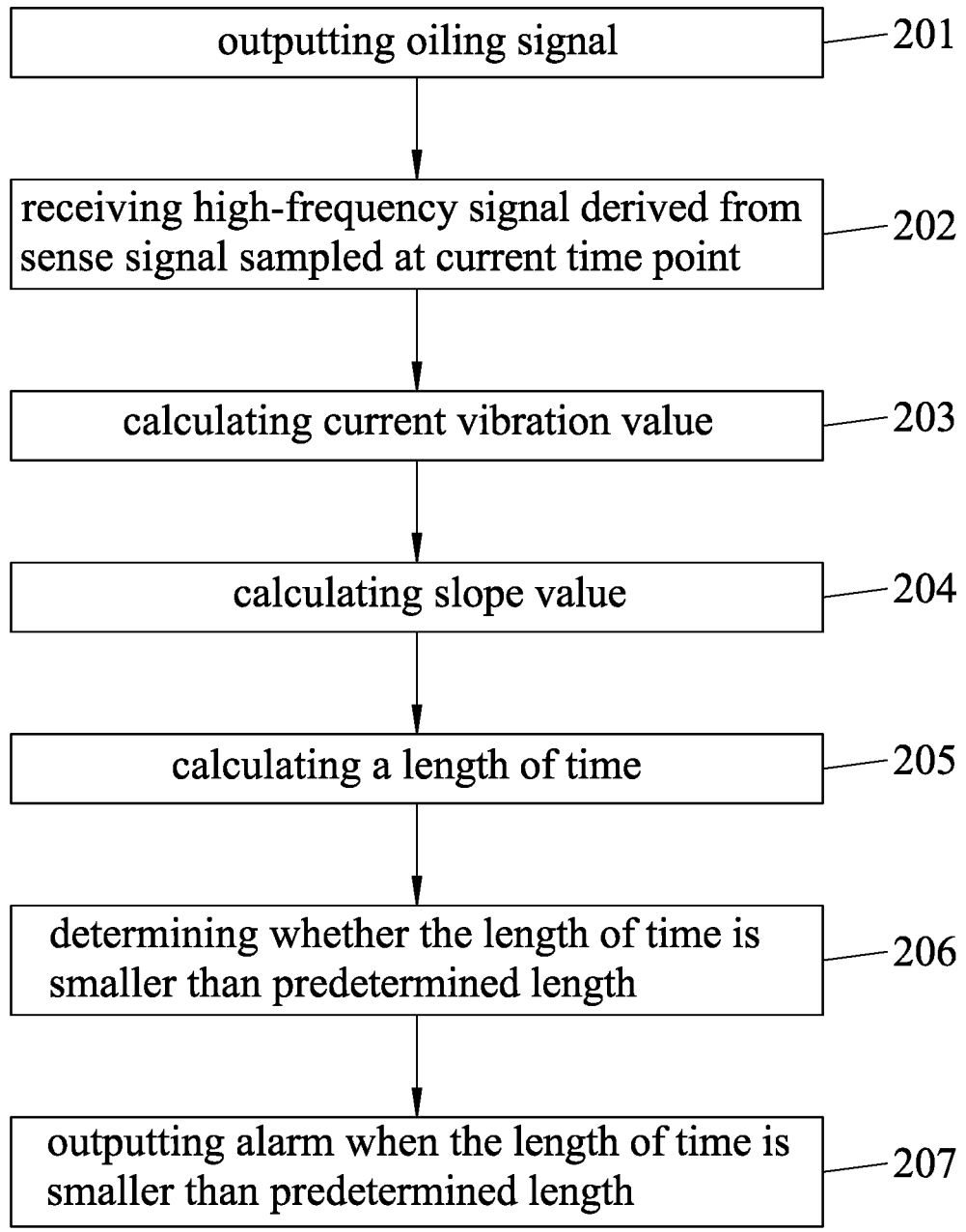
FIG. 2 schematically illustrates a method for evaluating residual operating life of a machine component according to an embodiment of this disclosure.

The control device 4 is configured to receive the low-frequency signal and the high-frequency signal from the signal-processing device 3, to output an oiling signal to the machine tool 9 based on the low-frequency signal and the high-frequency signal thus received, and to evaluate residual operating life of the machine component 92 after outputting the oiling signal. FIG. 2 schematically illustrates a method for evaluating residual operating life of the machine component 92 that is to be performed by the control device 4 according to an embodiment of this disclosure.

Referring to FIG. 2, prior to performing the method, in step 201, the control device 4 outputs an oiling signal to the machine tool 9 to trigger the oiling device 91 to oil the machine component 92. According to an embodiment, the act of outputting the oiling signal may be based on the low-frequency signal and the high-frequency signal that are received from the signal-processing device 3 and that are derived from the sense signal sampled at a time point earlier than the onset of step 201. According to an embodiment, the control device 4 outputs the oiling signal only when any of the following two conditions is met: 1) an accumulated moving distance calculated based on the low-frequency signal being greater than a moving-distance threshold; and 2) a vibration-variation value calculated based on the high-frequency signal being greater than a vibration-variation threshold. In particular, the accumulated moving distance is related to a distance the machine component 92 has moved since the last time the machine component 92 was oiled, and the vibration-variation value is related to a difference between a vibration level of the machine component 92 that was sensed at a time point the machine component 92 was freshly oiled the most recent time (right about the moment the machine component 92 was oiled the last time) and a vibration level of the machine component 92 that was sensed at a period of time after the machine component 92 was oiled the most recent time. However, in another embodiment, the control device 4 also outputs the oiling signal to the machine component 92 when a predetermined time period has elapsed since the last time the machine component 92 was oiled.

In step 202, the control device 4 begins to perform the method for evaluating the residual operating life of the machine component 92, and receives, from the signal-processing device 3, the high-frequency signal that is derived from the sense signal sampled at a current time point (this high-frequency signal may be referred to as the current high-frequency signal hereafter). The current time point is right about the moment the machine component 92 was oiled by the oiling device 91 in response to the oiling signal the control device 4 outputted in step 201.

In step 203, the control device 4 calculates a current vibration value based on the current high-frequency signal. The current vibration value is related to vibration that may be caused by, for example, a scratch or a pit on the machine component 92.

In step 204, the control device 4 calculates a slope value based on the current time point, the current vibration value, a last time point and a last vibration value, wherein the last time point is right about the moment the machine component 92 was oiled last time before step 201, and the last vibration value is calculated based on a last high-frequency signal that is derived from the sense signal sampled at the last time point. Specifically, according to an embodiment, the slope value may be calculated as a ratio of a vibration-value difference to a time difference. The vibration-value difference is a difference between the current vibration value and the last vibration value, and the time difference is a difference between the current time point and the last time point. The slope value can be expressed by the following equation:

$$S=(Vc2-Vc1)/\Delta T,$$

where S is the slope value, Vc2 is the current vibration value, Vc1 is the last vibration value, and $\Delta T$ is the time difference.

In step 205, the control device 4 calculates a length of time related to the residual operating life of the machine component 92 based on the slope value, the current vibration value and a predetermined vibration threshold. In an embodiment, the predetermined vibration threshold is related to an extreme vibration level of the machine component 92 that still maintains the yield rate of the machine tool 9 at an acceptable level or that still guarantees safety of operator(s) of the machine tool 9. According to an embodiment, the length of time is calculated as a quotient of a difference between the predetermined vibration threshold and the current vibration value divided by the slope value.

Figure 3:
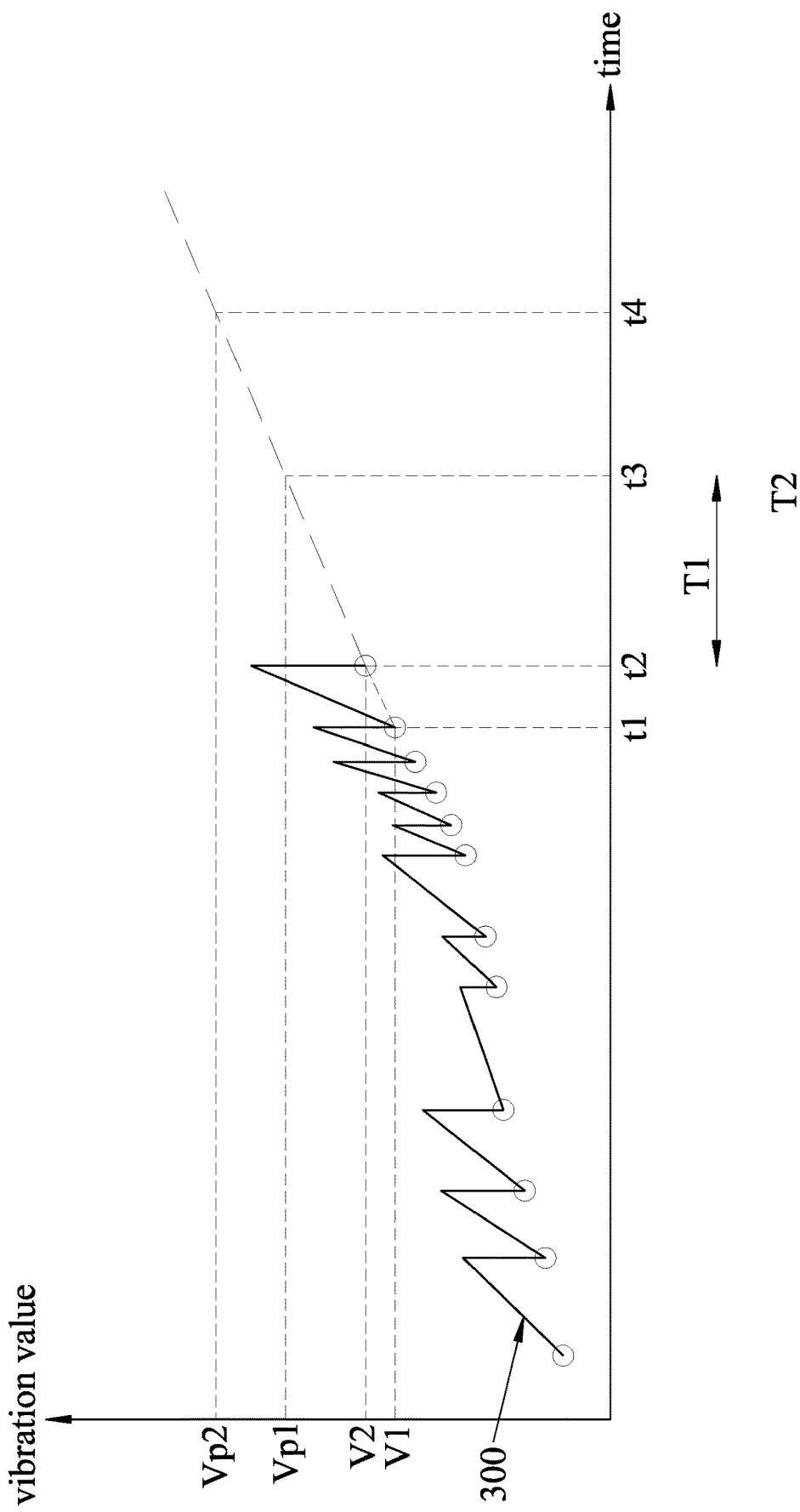
FIG. 3 schematically illustrates a curve of vibration values according to an embodiment of this disclosure.

A paragraph exemplarily illustrating a relationship between the current time point, the last time point, the current vibration value, the last vibration value, and the length of time is shown in FIG. 3, in which a curve 300 (in solid line) records vibration values corresponding to vibration levels of the machine component 92 as sensed at different time points by the sensor 2. Each data point marked with a circle corresponds to vibration of the machine component 92 that the sensor 2 sensed right when the machine component 92 was freshly oiled. In the illustration of FIG. 3, t2 is the current time point, t1 is the last time point, the current vibration value (Vc2) is equal to V2, and the last vibration value (Vc1) is equal to V1. The slope value (S) calculated in step 204 is the slope of the short-dashed line between the data points respectively at the time points t1 and t2, i.e., S=(V2−V1)/(t2−t1). If the predetermined vibration threshold is set to Vp1, the length of time would be T1 between the time points t2 and t3, i.e., T1=(Vp1−V2)/S; if the predetermined vibration threshold is set to Vp2, the length of time would be T2 between t2 and t4, i.e., T2=(Vp2−V2)/S. It can be seen from FIG. 3 that the time points t3 and t4 can be located by making an extrapolated line from the termination of the curve 300 (i.e., the data point corresponding to time point t2) to have the slope of the short-dashed line between the data points respectively at the time points t1 and t2 (the extrapolated line is shown with long-dashed line).

In step 206, the control device 4 determines whether the length of time (T1 or T2) thus calculated is smaller than a predetermined length. The predetermined length may be, for example, a few days, a week, two weeks, three weeks, a month, two months or three months.

In step 207, when it is determined in step 206 that the length of time is smaller than the predetermined length, the control device 4 enables output of an alarm to notify users that the residual operating life of the machine component 92 is short (e.g., shorter than a few days or a week) or that the machine component 92 needs to be replaced. According to some embodiments, the control device 4 may include an alarm unit (not shown) that is configured to output the alarm by, for example, generating light or sound, or displaying a text message, and the alarm unit may include a lighting device (e.g., a light bulb), a sounding device (e.g., a speaker) or a display screen accordingly. According to other embodiments, the control device 4 may be configured to send electrical signals to the controller 93 or other alarm device(s) in order for the machine tool 9 or the other alarm device(s) to output the alarm in the form of light, sound or text message(s). For example, in an embodiment, the control device 4 enables output of the alarm in step 207 by transmitting an electrical signal to a display device 5 in communication with the control device 4 so as to control the display device 5 to display a message indicating that the residual operating life of the machine component 92 is short (e.g., shorter than a few days or a week) or indicating that the machine component 92 needs to be replaced. The display device 5 may be a monitor that is electrically connected to the control device 4 and that is integrated in the control device 4 or that serves as a stand-alone device, a screen of a mobile device in communication with the control device 4, or a screen of a computing device (e.g., a computer) in communication with the control device 4.

In a more advanced embodiment, the control device 4 may communicate with an enterprise resource planning (ERP) system 8, and the control device 4 may further output, in step 207, information of the machine component 92 to the ERP system 8 which may initiate purchase of the machine component 92 in response to receiving the information from the control device 4. The information may include, for example, a time when the alarm is outputted, a product name of the machine component 92, or a model number of the machine component 92. The ERP system 8 is, for example, a server operated by a third party that conducts the integrated management of core business processes.

Alterations may be made to the method described above. For example, in an embodiment, the control device 4 calculates two lengths of time, namely, a first length of time (e.g., T1 in FIG. 3) and a second length of time (e.g., T2 in FIG. 3), related to the residual operating life of the machine component 92 in step 205. In particular, the first length of time is not very close to the estimated residual operating life of the machine component 92 and is calculated with a first predetermined vibration threshold (e.g., Vp1 of FIG. 3), while the second length of time is very close to or equals the residual operating life of the machine component 92 and is calculated with a second predetermined vibration threshold (e.g., Vp2 of FIG. 3) greater than the first predetermined vibration threshold. The first predetermined vibration threshold may be selected based on performance factors, and the second predetermined vibration threshold may be selected based on functionality of the machine tool 9 and/or safety factors. For example, the second predetermined vibration threshold may be selected to be 70 to 95 percent of a critical vibration value under which the machine component 92 would be too aged or too damaged to operate safely, and the first predetermined vibration threshold may be selected to be 50 to 80 percent of the critical vibration. The first and second predetermined vibration thresholds can be determined by experience, through experimentation, simulations, etc. In this embodiment, the control device 4 determines in step 206 whether the first length of time (T1) thus calculated is smaller than a first predetermined length, and determines whether the second length of time (T2) thus calculated is smaller than a second predetermined length. The first predetermined length may be, for example, a few days, a week, two weeks or three weeks in order to accommodate preparation time needed for maintenance and/or examination of the machine component 92. The second predetermined length may be, for example, a month, two months or three months in order to accommodate preparation time needed for replacement of the machine component 92. Then, in step 207, the control device 4 enables output of a first alarm when it is determined in step 206 that the first length of time (T1) is smaller than the first predetermined length, and enables output of a second alarm different from the first alarm when it is determined in step 206 that the second length of time (T2) is smaller than the second predetermined length. In some embodiments, each of the first and second alarms is a physical alarm (e.g., light, sound or text messages) outputted by the control device 4 to notify users that the residual operating life of the machine component 92 is short (first alarm) or that the machine component 92 needs to be replaced (second alarm). In an embodiment, the control device 4 is configured to transmit a first electrical signal to the display device 5 so as to control the display device 5 to output the first alarm by displaying a message indicating that the residual operating life of the machine component 92 is short and needs attention, and to transmit a second electrical signal to the display device 5 so as to control the display device 5 to output the second alarm by displaying a message indicating that the machine component 92 needs to be replaced. In the embodiment, the control device 4 may further output information of the machine component 92 to the ERP system 8. In the embodiment, after the second alarm is outputted, the control device 4 may further periodically (e.g., every eight hours) enable output of a reminder to remind a user/operator of the machine tool 9 that the machine component 92 needs to be replaced, until a confirmation signal has been received. For example, the confirmation signal may be transmitted in response to a user input (through, for example, a button or a touch screen) that confirms that the machine component 92 has been replaced. Similar to the alarm, the reminder may be in a form of light, sound or a text message. Additionally, after outputting the information of the machine component 92 to the ERP system 8, the control device 4 may periodically (e.g., every day) deliver a reminder signal to the ERP system 8 until another confirmation signal from the ERP system 8 has been received, wherein the another confirmation signal confirms that the machine component 92 has been purchased.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for evaluating residual operating life of a machine component of a machine tool, the machine tool further including an oiling device for oiling the machine component, said control system comprising:
    a sensor that is to be disposed on the machine tool, and that is configured to sense movement of the machine component and to output a sense signal related to vibration of the machine component based on the movement of the machine component thus sensed;
    a signal-processing device that is capable of communication with said sensor; and
    a control device that is coupled to said signal-processing device and that is configured to output an oiling signal to the machine tool to trigger the oiling device to oil the machine component,
    wherein said signal-processing device is configured to:
        receive the sense signal from said sensor,
        derive, from the sense signal, a high-frequency signal corresponding to a high frequency band and a low-frequency signal corresponding to a low frequency band, and
        transmit the high-frequency signal and the low-frequency signal thus derived to said control device,
    wherein said control device is further configured to:
        receive the high-frequency signal and the low-frequency signal from said signal-processing device,
        calculate an accumulated moving distance based on the low-frequency signal thus received,
        calculate a vibration-variation value based on the high-frequency signal thus received,
        output the oiling signal to the machine tool when the accumulated moving distance thus calculated is greater than a moving-distance threshold,
        output the oiling signal to the machine tool when the vibration-variation value thus calculated is greater than a vibration-variation threshold,
        after a current output of the oiling signal, calculate a current vibration value based on the high-frequency signal that is received from said signal-processing device and that is derived from the sense signal sampled at a current time point after the current output of the oiling signal,
        calculate a slope value based at least on the current time point and the current vibration value,
        calculate a first length of time based on the slope value, the current vibration value and a first predetermined vibration threshold,
        determine whether the first length of time is smaller than a first predetermined length, and
        enable output of a first alarm when it is determined that the first length of time is smaller than the first predetermined length.

2. The control system of claim 1, wherein said control device is to calculate the slope value as a ratio of a vibration-value difference to a time difference, the vibration-value difference being a difference between the current vibration value and a last vibration value that is calculated by said control device based on the sense signal sampled at a last time point after a last output of the oiling signal, the time difference being a difference between the current time point and the last time point.

3. The control system of claim 1, wherein said control device is to calculate the first length of time as a quotient of a difference between the first predetermined vibration threshold and the current vibration value divided by the slope value.

4. The control system of claim 1, further comprising a display device configured to communicate with said control device, wherein said control device is to enable output of the first alarm by transmitting an electrical signal to said display device so as to control said display device to display a message indicating that the residual operating life of the machine component is short.

5. The control system of claim 1, wherein said control device is further configured to:

calculate a second length of time based on the slope value, the current vibration value, and a second predetermined vibration threshold that is greater than the first predetermined vibration threshold;

determine whether the second length of time is smaller than a second predetermined length; and enable output of a second alarm when it is determined that the second length of time is smaller than the second predetermined length.

6. The control system of claim 5, wherein said control device is to calculate the second length of time as a quotient of a difference between the second predetermined vibration threshold and the current vibration value divided by the slope value.

7. The control system of claim 5, further comprising a display device configured to communicate with said control device, wherein said control device is to enable output of the second alarm by transmitting an electrical signal to said display device so as to control said display device to display a message indicating that the machine component needs to be replaced.

8. The control system of claim 5, wherein said control device is further configured to, when it is determined that the second length of time is smaller than the second predetermined length, output information of the machine component.

9. The control system of claim 8, wherein said control device is configured to communicate with an enterprise resource planning (ERP) system, and is to output the information of the machine component to the ERP system.

10. The control system of claim 5, wherein said control device is further configured to, after the second alarm is outputted, periodically enable output of a reminder to remind a user that the machine component needs to be replaced until a confirmation signal has been received.

11. A method for evaluating residual operating life of a machine component of a machine tool, the machine tool further including an oiling device that oils the machine component when receiving an oiling signal, the method to be implemented by a control device that is coupled to a signal-processing device which receives a sense signal outputted by a sensor disposed on the machine tool and which derives a low-frequency signal and a high-frequency signal corresponding respectively to different frequency bands from the sense signal, the method comprising steps of:

receiving the low-frequency signal and the high-frequency signal from the signal-processing device;

calculating an accumulated moving distance based on the low-frequency signal;

calculating a vibration-variation value based on the high-frequency signal;

outputting the oiling signal to the machine tool when the accumulated moving distance thus calculated is greater than a moving-distance threshold;

outputting the oiling signal to the machine tool when the vibration-variation value thus calculated is greater than a vibration-variation threshold;

right after a current output of the oiling signal to the machine tool, calculating a current vibration value based on the sense signal that is sensed at a current time point;

calculating a slope value based at least on the current time point and the current vibration value;

calculating a length of time based on the slope value, the current vibration value and a predetermined vibration threshold;

determining whether the length of time is smaller than a predetermined length; and enabling output of an alarm when it is determined that the length of time is smaller than the predetermined length.

12. The method of claim 11, further comprising, before the step of calculating a current vibration value, a step of calculating a last vibration value based on the sense signal sampled at a last time point after a last output of the oiling signal by the control device;

wherein the step of calculating a slope value includes calculating a vibration-value difference between the current vibration value and the last vibration value, calculating a time difference between the current time point and the last time point, and calculating the slope value as a ratio of the vibration-value difference to the time difference.

13. The method of claim 11, wherein the step of calculating a length of time is to calculate the length of time as a quotient of a difference between the predetermined vibration threshold and the current vibration value divided by the slope value.

14. The method of claim 11, further comprising a step of:

when it is determined that the length of time is smaller than the predetermined length, outputting, to an enterprise resource planning (ERP) system, information of the machine component.

15. The method of claim 11, further comprising, after the step of enabling output of an alarm, a step of:

periodically enabling output of a reminder to remind a user that the machine component needs to be replaced until a confirmation signal has been received.

\* \* \* \* \*